US011392826B2

(12) United States Patent
Verma et al.

(10) Patent No.: US 11,392,826 B2
(45) Date of Patent: Jul. 19, 2022

(54) NEURAL NETWORK-ASSISTED COMPUTER NETWORK MANAGEMENT

(71) Applicant: Cisco Technology, Inc., San Jose, CA (US)

(72) Inventors: Saurabh Verma, Minneapolis, MN (US); Gyana R. Dash, San Jose, CA (US); Shamya Karumbaiah, Philadelphia, PA (US); Arvind Narayanan, Minneapolis, MN (US); Manjula Shivanna, San Jose, CA (US); Sujit Biswas, San Jose, CA (US); Antonio Nucci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1239 days.

(21) Appl. No.: 15/855,781

(22) Filed: Dec. 27, 2017

(65) Prior Publication Data

US 2019/0197397 A1   Jun. 27, 2019

(51) Int. Cl.
*G06N 3/08* (2006.01)
*G06N 3/04* (2006.01)
(Continued)

(52) U.S. Cl.
CPC .................. *G06N 3/08* (2013.01); *G06N 3/04* (2013.01); *H04L 41/12* (2013.01); *H04L 41/16* (2013.01)

(58) Field of Classification Search
CPC ..................................... G06N 3/08; G06N 3/04
See application file for complete search history.

(56) References Cited

U.S. PATENT DOCUMENTS

2017/0357274 A1* 12/2017 Baughman ........... A61B 5/0205
2018/0005151 A1*  1/2018 Liao .................... G06Q 10/0637

OTHER PUBLICATIONS

Du, M., Li, F., Zheng, G., & Srikumar, V. (Oct. 2017). Deeplog: Anomaly detection and diagnosis from system logs through deep learning. In Proceedings of the 2017 ACM SIGSAC Conference on Computer and Communications Security (pp. 1285-1298). (Year: 2017).*

(Continued)

*Primary Examiner* — Kamran Afshar
*Assistant Examiner* — Lokesha G Patel
(74) *Attorney, Agent, or Firm* — Lee & Hayes, P.C.

(57) ABSTRACT

Sequences of computer network log entries indicative of a cause of an event described in a first type of entry are identified by training a long short-term memory (LSTM) neural network to detect computer network log entries of a first type. The network is characterized by a plurality of ordered cells $F_i=(x_i, c_{i-1}, h_{i-1})$ and a final sigmoid layer characterized by a weight vector $w^T$. A sequence of log entries $x_i$ is received. An $h_i$ for each entry is determined using the trained $F_i$. A value of gating function $G_i(h_i, h_{i-1})=\Pi(w^T(h_i-h_{i-1})+b)$ is determined for each entry. $\Pi$ is an indicator function, b is a bias parameter. A sub-sequence of $x_i$ corresponding to $G_i(h_i, h_{i-1})=1$ is output as a sequence of entries indicative of a cause of an event described in a log entry of the first type.

19 Claims, 7 Drawing Sheets

(51) Int. Cl.
*H04L 41/12* (2022.01)
*H04L 41/16* (2022.01)

(56) References Cited

OTHER PUBLICATIONS

Taylor, A., Leblanc, S., & Japkowicz, N. (Oct. 2016). Anomaly detection in automobile control network data with long short-term memory networks. In 2016 IEEE International Conference on Data Science and Advanced Analytics (DSAA) (pp. 130-139). IEEE. (Year: 2016).*

Zhang, K., Xu, J., Min, M. R., Jiang, G., Pelechrinis, K., & Zhang, H. (Dec. 2016). Automated IT system failure prediction: A deep learning approach. In 2016 IEEE International Conference on Big Data (Big Data) (pp. 1291-1300). IEEE. (Year: 2017).*

* cited by examiner

400

---

Training a long-short term memory (LSTM) recurrent neural network to detect computer network log entries of a first type in sequences of computer network log entries, the LSTM network characterized by a plurality of ordered cells $F_i$ and a final sigmoid layer
410

↓

Receiving a sequence of computer network log entries $x_i$ from one or more network devices of the computer network
420

↓

Determining $h_i$ for each log entry $x_i$ in accordance with the trained $F_i$ ($x_i, c_{i-1}, h_{i-1}$)
430

↓

Determining a value of a gating function $G_i(h_i, h_{i-1}) = \Pi(w^T(h_i - h_{i-1}) + b)$ for each log entry $x_i$, where $\Pi$ is an indicator function yielding "1" for a positive value of its argument, and "0" otherwise, $b$ is a bias parameter, and $w^T$ is a weight vector of the final sigmoid layer of the LSTM model
440

↓

Outputting a sub-sequence of the computer network log entries xi corresponding to $G_i(h_i, h_{i-1}) = 1$ as a potential root cause pattern of an entry of the type corresponding to the last entry in the outputted sequence
450

FIG. 4

NEURAL NETWORK-ASSISTED COMPUTER NETWORK MANAGEMENT

TECHNICAL FIELD

The disclosed technology relates to the management of computer networks. In particular, the technology relates to the use of long short-term memory (LSTM) recurrent neural networks to identify sequences of computer network log entries indicative of a cause of an event described in a computer network log entry.

BACKGROUND

In computing, "artificial neural networks" are systems inspired by biological neural networks. Artificial neural networks (hereinafter, simply "neural networks") can learn, that is progressively improve performance, by considering examples, generally without task-specific programming. Neural networks comprise a collection of connected artificial "neurons," or cells, analogous to biological neurons. Each connection, or "synapse," between cells can transmit a signal from one cell to another. The receiving cell can process the signal(s) and then communicate with other cells connected to it.

In typical implementations, the output of each cell, the synapse signal, is calculated by a non-linear function of its inputs. Cells and synapses may be characterized by weights that vary as learning proceeds, which weights can increase or decrease the strength of the signal that is output. Further, each cell may be characterized by a threshold such that, only if the aggregate signal meets the threshold, is the signal output. Typically, cells are organized in layers, with different layers performing different transformations on cell inputs. Signals travel from the first (input) to the last (output) layer within a cell, possibly after traversing the layers multiple times, that is recurrently. Neural networks may be "trained" by comparing the networks classification of inputs (which, at the outset, is largely arbitrary) with the known actual classification of the inputs. The errors from each iteration of training may be fed back into the network and used to modify the network's weights.

A recurrent neural network (RNN) is a class of neural network where connections between some layers form a directed cycle. This architecture allows an RNN to exhibit dynamic temporal behavior. Unlike other neural networks, RNNs can use internal memory to process arbitrary sequences of inputs. In training conventional RNNs, "gradient descent" may be used to minimize the error term by changing each weight in proportion to the derivative of the error with respect to that weight. However, such an approach can encounter the vanishing gradient problem, that is, the gradient can become so small as to effectively preventing the weight from changing its value.

Long short-term memory (LSTM) networks are RNNs that avoid the vanishing gradient problem. An LSTM neural network can prevent back-propagated errors from vanishing, or conversely, exploding. Instead, errors can flow backwards through unlimited layers of the LSTM cell.

BRIEF DESCRIPTION OF THE DRAWINGS

FIG. 4 is a block flow diagram depicting methods to identify sequences of computer network log entries indicative of a cause of an event described in a computer network log entry, in accordance with certain example embodiments.

DETAILED DESCRIPTION OF EXAMPLE EMBODIMENTS

Advances in artificial intelligence, especially in deep learning through neural networks, have shown effectiveness in detecting anomalies, e.g., detecting cancer, finding new galaxies. When it comes to a sequence type of data, for example, computer network logs and computer network telemetry, LSTM networks are capable enough to detect events such as network failures. However, conventional LSTM networks alone leave unanswered which inputs might be related the detected events and are not helpful in troubleshooting the event from a network management perspective.

Embodiments herein provide computer-implemented methods, systems, and computer program products to identify sequences of computer network log entries indicative of a cause of an event described in a computer network log entry. In some embodiments, the existence of sequences that indicate an upcoming event can be determined. By using and relying on the methods and systems described herein, the technology disclosed herein provides for identifying causal chains likely to have lead to network failure events and warning of impending network failure events. As such, the technologies described herein may be employed to display such causal chains and warnings to a network operator, and input such causal chains and warnings into automated network management systems to implement recover and mitigation strategies, such as changing the configuration of the physical network by disabling certain devices and reassigning the function the disabled devices to other network devices, or creating alternate functionality for the processed performed by the about-to-fail component(s), and then isolating or powering down the about-to-fail components.

These and other aspects, objects, features, and advantages of the example embodiments will become apparent to those having ordinary skill in the art upon consideration of the following detailed description of illustrated example embodiments. Turning now to the drawings, in which like numerals represent like (but not necessarily identical) elements throughout the figures, example embodiments are described in detail.

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Figure 1:
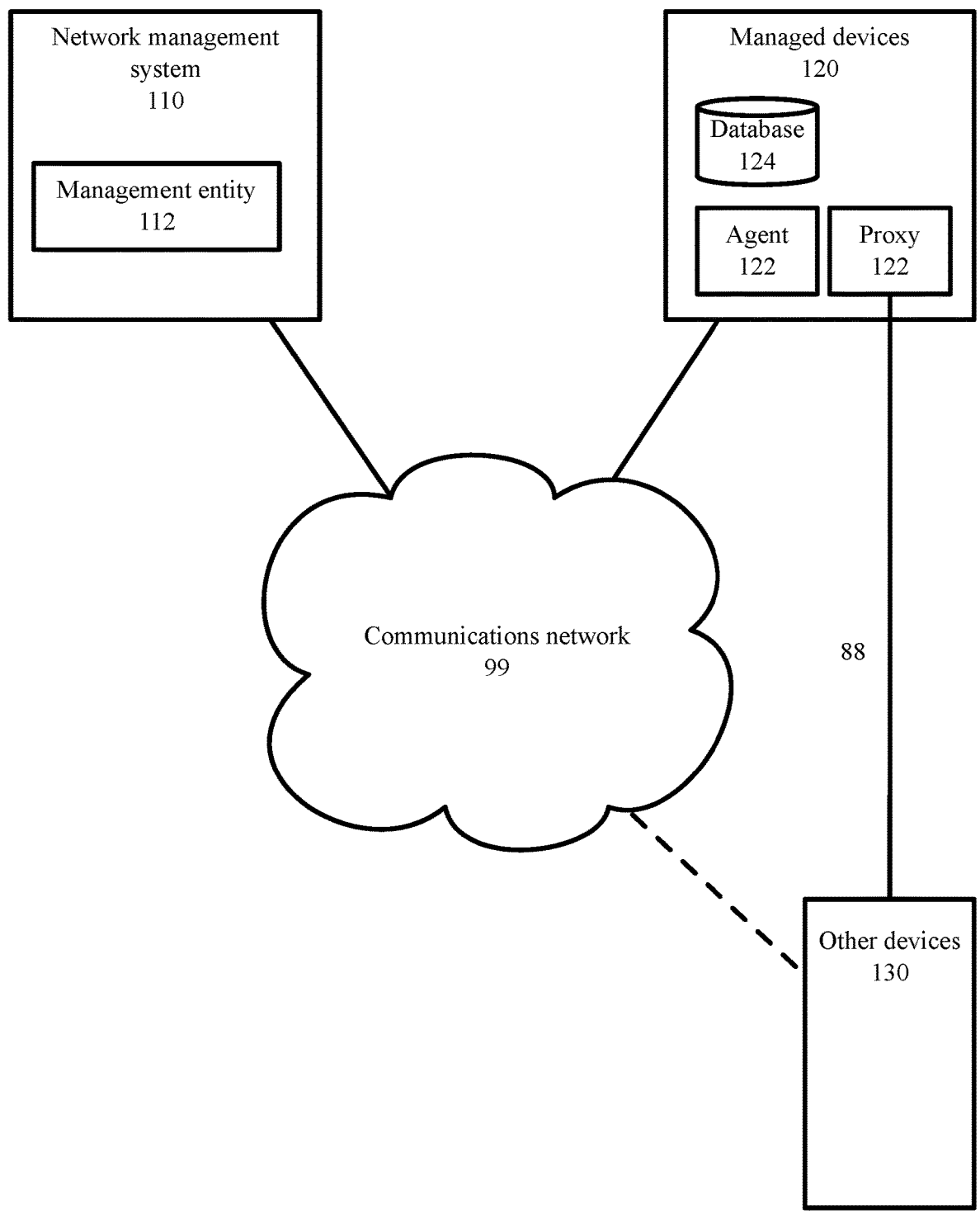
FIG. 1 is a block diagram depicting a communications and processing architecture to identify sequences of computer network log entries indicative of a cause of an event described in a computer network log entry, in accordance with certain example embodiments.

FIG. 1 is a block diagram depicting a communications and processing architecture 100 for network management. As depicted in FIG. 1, the architecture 100 includes computer network management system 110, a plurality of managed devices 120, and a plurality of other devices 130 connected by communications network 99. Network management can involve the use of distributed databases, auto-polling of network devices, automatic isolation of problem devices along with replication of the function of troubled devices in other network elements, and high-end workstations generating real-time graphical views of network topology changes, events (including failures), and traffic. In general, network management can employs a variety of tools, applications, and devices to assist human network managers in monitoring and maintaining networks.

Most network management architectures use the same basic structure and set of relationships. Managed devices 120, such as computer systems and other network devices, run software that enables them to send alerts, typically in the form of network log entries, when the managed devices 120 detect problems (for example, when one or more user-determined thresholds are exceeded). Upon receiving these alerts, management entities 112, executing on the network management systems 110 are programmed to react by executing one, several, or a group of actions, including operator notification, event logging, shutdown and replacement of faulty processes and devices, and other automatic attempts at system repair. In some embodiments, the management entity 110 can execute on a managed device 120, either for the managed device alone, or responsible for a plurality of managed devices.

Management entities 112 also can poll managed devices 120 over network 99 to check the values of certain variables. Polling can be automatic or user-initiated. Agents 122 in the managed devices 120 respond to the polls over network 99. Agents 122 can be software modules that first compile information about the managed devices 120 in which they reside (or on other network devices for which the agent 122 is responsible), then store this information in a management database 124, and finally provide it (proactively or reactively) to management entities 112 within network management systems 110 via a network management protocol over network 99. Well-known network management protocols include the Simple Network Management Protocol (SNMP) and Common Management Information Protocol (CMIP). Management proxies are entities that provide management information on behalf of other devices 130, for example, network devices lacking an agent 122.

Each of the network management system 110, managed devices 120, and some other devices 130, includes one or more wired or wireless telecommunications systems by which network devices may exchange data. For example, the service provider network 150 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH (ID wireless technology connection, a near field communication (NFC) connection, any combination thereof, and any other appropriate architecture or system that facilitates the communication of signals, data, and/or messages.

Throughout the discussion of example embodiments, it should be understood that the terms "data" and "information" are used interchangeably herein to refer to text, images, audio, video, or any other form of information that can exist in a computer-based environment.

Each network device can include a communication subsystem capable of transmitting and receiving data over the network(s) it communicates with. For example, each network device can include a server, or a partition of a server, router virtual machine (VM) or container, a portion of a router, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, a user associated with a device must install an application and/or make a feature selection to obtain the benefits of the technology described herein.

The network connections illustrated are examples and other approaches for establishing a communications link between the computers and devices can be used. Additionally, those having ordinary skill in the art and having the benefit of this disclosure will appreciate that the network devices illustrated in FIG. 1 may have any of several other suitable computer system configurations, and may not include all the components described above.

Figure 7:
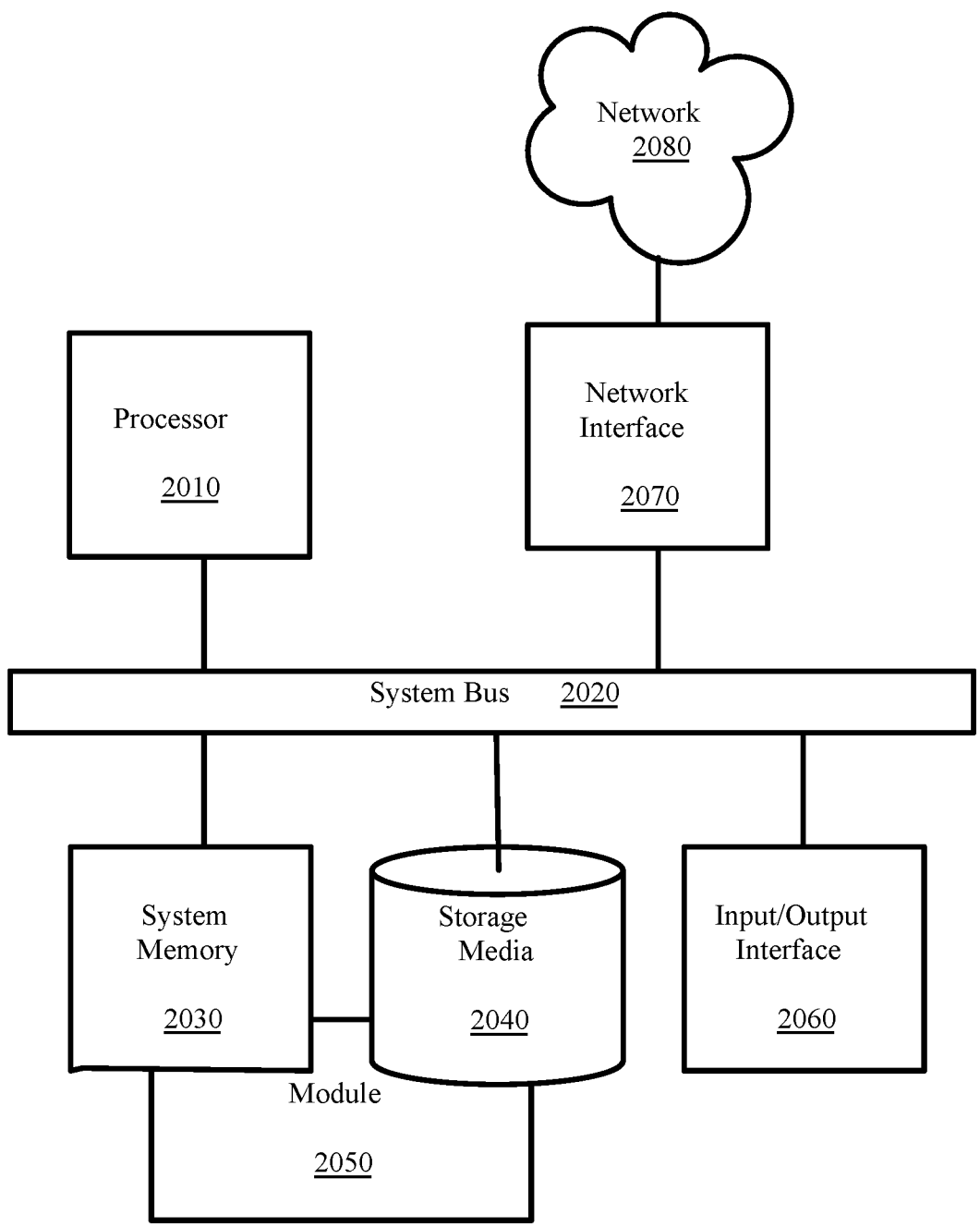
FIG. 7 is a diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 7. The computing machines discussed herein may communicate with one another, as well as with other computing machines or communication systems over one or more networks, such as network 99 and direct communication link 88. Each network may include various types of data or communications network, including any of the network technology discussed with respect to FIG. 7.

Example Embodiments

The examples illustrated in the following figures are described hereinafter with respect to the components of the example operating environment and example architecture 100 described elsewhere herein. The example embodiments may also be practiced with other systems and in other environments. The operations described with respect to the example processes can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
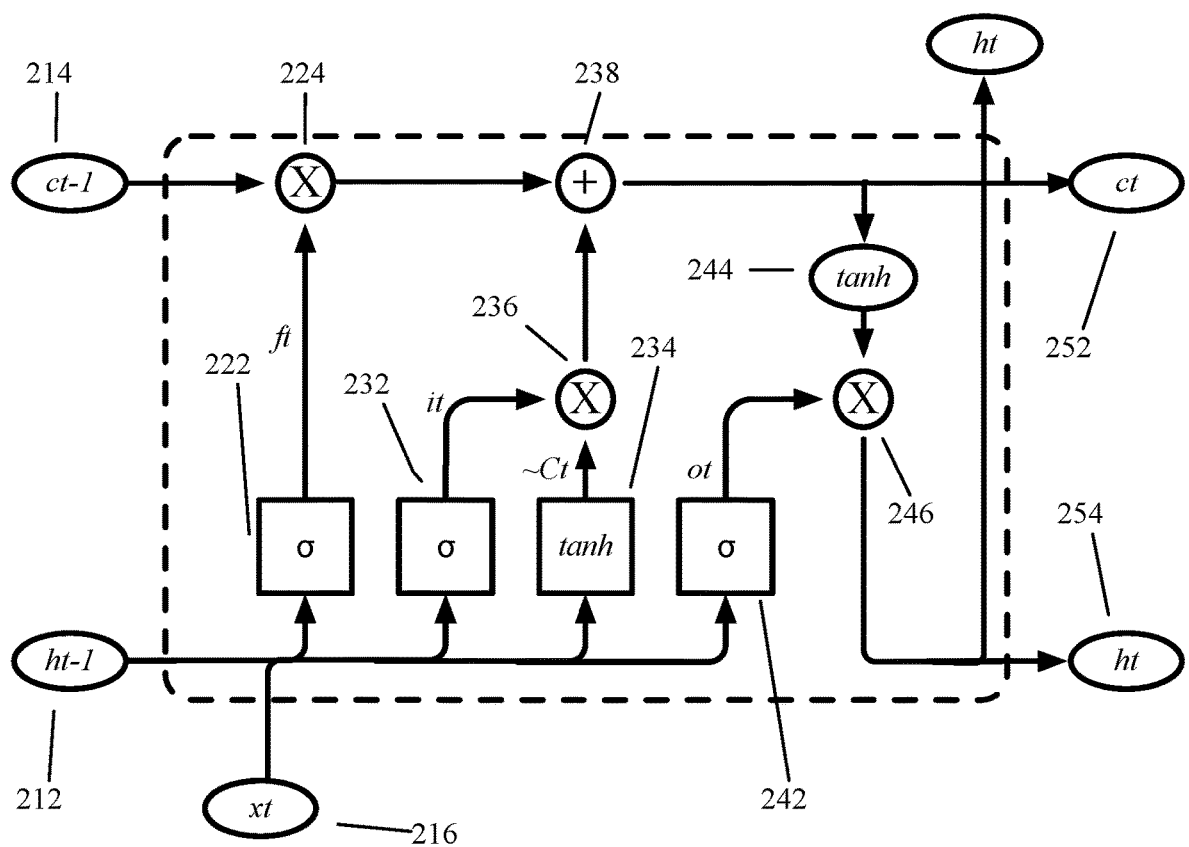
FIG. 2 is a block diagram representing operation of a cell in an LSTM recurrent neural network, in accordance with certain example embodiments.

Referring to FIG. 2, and continuing to refer to FIG. 1 for context, a block diagram representing operation of an example cell 200 in the LSTM recurrent neural network executing as part of a management entity 112 on a network management system 110 is shown, in accordance with certain example embodiments. Cell 200 is a "forget gate" cell, the second LSTM cell in this case, in a series of LSTM cells used as part of continuing example herein. Embodiments of the technology disclosed herein can use other types of LSTM cells, for example, "peephole" LSTM cells, and gated recurrent LSTM cells.

Cell 200, takes, as input, the outputs $h_{t-1}$ 212 and $c_{t-1}$ 214 of a previous LSTM cell, along with the network log entry corresponding to the current cell input $x_t$ 216 and applies various sigmoid and hyperbolic tangent ("tan h") functions to the inputs and to intermediate products. In general, unbiased sigmoid and hyperbolic tangent functions are "s"-shaped functions (bounded by asymptotes in output values with transition between one asymptotic value and the other occurring a "0" for the input value). The unbiased sigmoid function (the logistic sigmoid) has a positive output at "0" input, while the unbiased tan h function has a "0" output at "0" input. The asymptotes for an unbiased sigmoid are 0/1, while the asymptotes for an unbiased tan h are −1/+1.

The first layer of cell 200, executing as part of a management entity 112 on a network management system 110, applies a sigmoid gating function 222 of Equation (1) to $h_{t-1}$ and to $x_t$.

$$f_t = \sigma(W_f x_t + U_f h_{t-1} + b_f) \quad (1)$$

Each of $f_t$ and $b_f$, is an h-length vector (that is, $f_t$ and $b_f$ are the same length as the vector h). The input data, $x_t$, is a data vector of length d. $W_f$ is a weight matrix of dimension h×d determined during training and applied to $x_t$ during use of the cell 200 in the LSTM model. $U_f$ is a weight matrix of dimension h×h determined during training and applied to $h_{t-1}$ during use of the cell 200 in the LSTM model. The vector $b_f$ is a bias parameter with element values that can be empirically chosen from a set of discrete values, typically near "0," for example {0.01, 0.02, 0.03, 0.04}. The output $f_t$, a vector with element values between "0" and "1," is then point-wise multiplied by the input $c_{t-1}$ at operation 224.

The second layer of cell 200, executing as part of a management entity 112 on a network management system 110, applies another sigmoid gating function 232 of Equation (2) to $h_{t-1}$ and to $x_t$.

$$i_t = \sigma(W_i x_t + U_i h_{t-1} + b_i) \quad (2)$$

Each of $i_t$ and $b_i$, is an h-length vector. $W_i$ is a weight matrix of dimension h×d determined during training and applied to $x_t$ during use of the cell 200 in the LSTM model. $U_i$ is a weight matrix of dimension h×h determined during training and applied to $h_{t-1}$ during use of the cell 200 in the LSTM model. The vector $b_i$ is a bias parameter vector with element values that are empirically chosen as described above.

The second layer of cell 200, executing as part of a management entity 112 on a network management system 110, also applies a tan h gating function 234 of Equation (3) to $h_{t-1}$ and to $x_t$.

$$\sim C_t = \tan h(W_c x_t + U_c h_{t-1} + b_c) \quad (3)$$

Each of $\sim C_t$ and $b_c$, is an h-length vector. $W_i$ is a weight matrix of dimension h×d determined during training and applied to $x_t$ during use of the cell 200 in the LSTM model, and $U_c$ is a weight matrix of dimension h×h determined during training and applied to $h_{t-1}$ during use of the cell 200 in the LSTM model. The vector $b_c$ is a bias parameter vector with element values that are be empirically chosen as described above.

The output $i_t$ is then point-wise multiplied with output $C_t$ at operation 236. The LSTM recurrent neural network executing as part of a management entity 112 on a network management system 110 then performs a point-wise addition, operation 238, on the outputs of operation 224 and operation 236, forming $c_t$ 252, an h-length vector, for use in the next LSTM cell.

The third layer of cell 200, executing as part of a management entity 112 on a network management system 110, also applies the sigmoid gating function 242 of Equation (4) to $h_{t-1}$ and to $x_t$.

$$o_t = \sigma(W_o x_t + U_o h_{t-1} + b_o) \quad (4)$$

Each of $o_t$ and $b_o$ is an h-length vector. $W_o$ is a weight matrix of dimension h×d determined during training and applied to $x_t$ during use of the cell 200 in the LSTM model. $U_o$ is a weight matrix of dimension h×h determined during training and applied to $h_{t-1}$ during use of the cell 200 in the LSTM model. The vector $b_o$ is a bias parameter vector with element values that can be empirically chosen as described above. The output $o_t$ is then point-wise multiplied with a tan $h(c_t)$ 244 at operation 246 forming $h_t$ 254 for use in the next LSTM cell.

Figure 3:
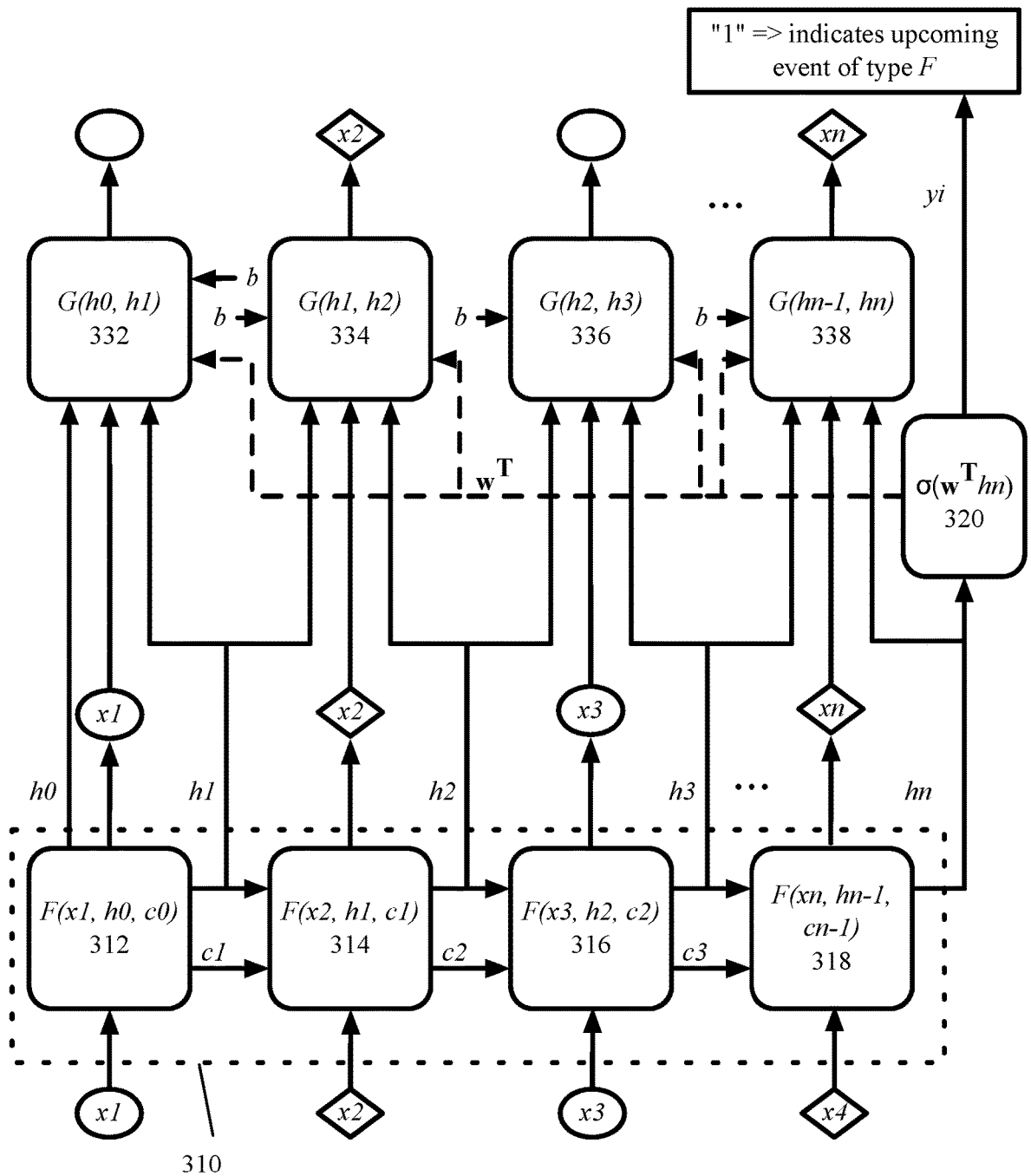
FIG. 3 is a block diagram representing the unrolled structure of LSTM cells, root cause extraction cells, and a fault prediction stage, in accordance with certain example embodiments.

Referring to FIG. 3, and continuing to refer to prior figure for context, a block diagram 300 representing an unrolled structure of a management entity 112 to identify sequences of computer network log entries indicative of a cause of an event described in a computer network log entry, and to indicate an upcoming instance of the event is shown, in accordance with certain example embodiments. In such a management entity 112, an LSTM model 310 includes a plurality of cells $F_1$ through $F_n$, such as cell 200 described above. The inputs and outputs for each of $F_1$ through $F_n$ are as described in connection with cell 200.

The management entity 112 includes final sigmoid function 320 to be described below in connection with example methods. In general, the sigmoid function 320 provides weight matrix $w^T$, determined during training, to each $G_n$ and outputs an indication of an upcoming event of a type for which the LSTM model is trained.

The management entity 112 includes functions $G_1$ through $G_n$, corresponding to $F_1$ through $F_n$; the example of FIG. 3 showing cells $G_1$ 332, $G_2$ 334, $G_3$ 336, and $G_n$, 338 to be described below in connection with example methods. In general, functions $G_1$ through $G_n$, are operative to select sequences of computer network log entries indicative of a cause of an event described in a computer network log entry.

In FIG. 3, the LSTM model 310 is trained to detect a network failure of a first type indicated in a series $\{x_1, x_2, x_3, \ldots x_n\}$ of computer network log entries. Cells $G_1$ 332, $G_2$ 334, $G_3$ 336, through $G_n$ 338 then identify the network log entries in the series that are indicative of a cause of the event shown as $\{x_2, x_n\}$ output from Cells $G_1$ 332, $G_2$ 334, $G_3$ 336, through $G_n$, 338 while $\{x_1, x_3\}$ and others not shown are suppressed.

Referring to FIG. 4, and continuing to refer to prior figures for context, a block flow diagram 400 depicting methods to identify sequences of computer network log entries indicative of a cause of an event described in a computer network log entry is shown, in accordance with certain example embodiments.

In such methods 400, the management entity 112 trains an LSTM recurrent neural network, such as network 310, to detect computer network log entries of a first type in sequences of computer network log entries. The LSTM network is characterized by a plurality of ordered cells $F_i$ and a final sigmoid layer—Block 410.

As described in connection with cell 200, the first cell $F_1$ is configured to output a cell state vector $c_1$ and an output vector $h_1$ based on a network log entry $x_1$ and a plurality of layered gating functions, the gating functions comprising a plurality of sigmoid layers and at least one hyperbolic tangent (tan h) layer. Each gating function is characterized by weights. Each cell $F_i$ after the first cell $F_1$ is configured to receive a subsequent sequential computer network log entry $x_i$, a cell state vector of the previous cell $c_{i-1}$, an output of previous cell $h_{i-1}$. Each cell $F_i$ after the first cell $F_1$ is configured to output a cell state vector $c_i$ and a new output vector $h_i$ based on $x_i$, $c_{i-1}$, $h_{i-1}$, and a plurality of layered gating functions. Each gating function is characterized by weights, as described above in connection with cell 200. The final sigmoid layer receives the $h_{final}$ output of $F_{final}$ and is characterized by a weight vector $w^T$ determined during training.

As a continuing example, consider an LSTM model 210 to be trained to detect an event labeled "SPA_OIR-3-RECOVERY_RELOAD." This event is logged by a managed device 120 when a managed device 120 (or other device 130 reporting to a managed device) on the network attempts an online insertion and removal (OIR) for a shared port adapter (SPA). In the period used to collect training data, there were 23 unique devices with an average of 2.2 "SPA_OIR-3-RECOVERY_RELOAD" events per device.

Figure 5:
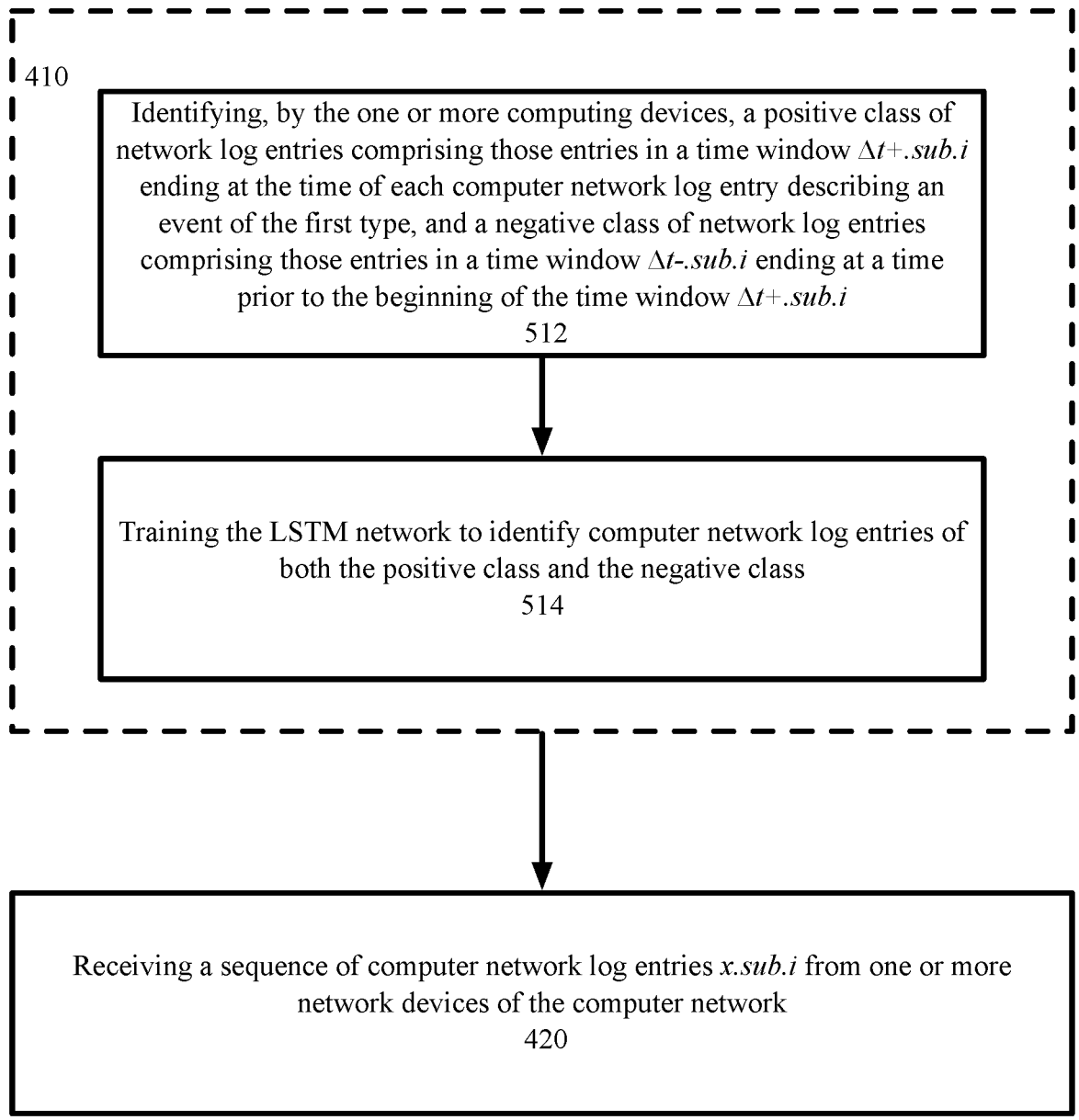
FIG. 5 is a block flow diagram depicting methods to train an LSTM recurrent neural network to detect computer network log entries of a first type in sequences of computer network log entries, in accordance with certain example embodiments.

Referring to FIG. 5, and continuing to refer to prior figures for context, methods 500 to train an LSTM recurrent neural network, such as network 310, to detect computer network log entries of a first type in sequences of computer network log entries are shown, in accordance with example embodiments. In such methods, the management entity 112 identifies, in a set of training data, a positive class of network log entries Block 512. The positive class includes those entries in a time window $\Delta t+_i$ ending at the time of each computer network log entry describing an event of the first type. The management entity 112 also identifies a negative class of network log entries. The negative class includes those entries in a time window $\Delta t-_i$ ending at a time prior to the beginning of the time window $\Delta t+_i$.

In some embodiments, the management entity separates the time window $\Delta t+_i$ and the time window $\Delta t-_i$ by a period of network log entries belonging to neither the positive call nor the negative class—a "cooling" period. In the continuing example, each of $\Delta t+_i$, $\Delta t-_i$, and the cooling period is set to twenty four (24) hours, with twenty eight (28) sequences in the positive class and two hundred forty one (241) sequences in the negative class two hundred sixty nine (269) total sequences.

The management entity then trains the LSTM network to identify computer network log entries of both the positive class and the negative class—Block 514. In some embodiments, the management entity 112 weights network log entries of the positive class greater than network log entries of the negative class prior to training. In the continuing example, a 10:1 (positive class $c_1$: negative class $c_2$) weighting is used. In some embodiments, training includes optimizing a binary cross entropy function that is a function of the trainable cell weights (the weights discussed above in connection with cell 200 of the $F_n$ functions, and the weights discussed below in connection with the $G_n$ functions and the final sigmoid function 320). Equation (5) is an example of one such loss function L $$L(t_1,y_2,t_2,y_2,\ldots,t_{269},y_{269})=w_{c1}\Sigma_{i=1}^{241} t_i \log y_i + w_{c2}\Sigma_{i=242}^{269}(1-t_i)\log(1-y_i) \quad (5)$$

In equation (5) $t_i$ represents ground truth label either 0 or 1. In this case, $t_i=0$ for $i\leq 241$ and $t_i=1$ for $i>241$. The optimization is done using a back-propagation algorithm. Once optimized, the values for all the trainable cell weights are available.

Returning to FIG. 4, the management entity 112 receives a sequence of computer network log entries $x_i$ from one or more network devices of the computer network Block 420. In some embodiments, the management entity 112 can execute on a network node other than a dedicated network management system 110, for example, the management entity, including the model trained in Block 410 can execute on a managed device 120. The management entity 112 can receive the sequence of computer network log entries in real time, or in a batch. In the continuing example, the management entity receives $\{x_1, x_2, x_3, \ldots x_n\}$ corresponding to the series of log entries {DOS_VULNERABILITY, BGP-5-ADJCHANGE, ROUTER_TABLE_RESET, ... LINK-5-CHANGED}. In particular, the subsequence {BGP-5-ADJCHANGE, LINK-5-CHANGED} is relevant to SPA_OIR-3-RECOVERY_RELOAD. In other examples, historic network logs are received to examine a range of log entries that can be indicative of various events of interest.

The management entity 112 executes the model trained in Block 410 to determine $h_i$ for each log entry $x_i$ in accordance with the trained $F_i$ ($x_i$, $c_{i-1}$, $h_{i-1}$)—Block 430. In the continuing example, the management entity executes a one model trained in Block 410 to determine $h_i$ corresponding to each of {DOS_VULNERABILITY, BGP-5-ADJCHANGE, ROUTER_TABLE_RESET, ... LINK-5-CHANGED}. In other embodiments, the management entity 112 executes one trained model for each network event type of interest.

The management entity 112 determines a value of a gating function $G_i(h_i, h_{i-1})=\mathrm{II}$ ($w^T(h_i-h_{i-1})+b$) for each log entry $x_i$—Block 440. II is an indicator function yielding "1" for a positive value of its argument, and "0" otherwise. The bias parameter b is selected during training as described above. The weight vector $w^T$ of the final sigmoid layer of the LSTM model is determined during training as described above. In the continuing example, the indicator function is {0, 1, 0, ... 1}, indicating that {BGP-5-ADJCHANGE, LINK-5-CHANGED} is a sequence of computer network log entries indicative of a cause of the event SPA_OIR-3-RECOVERY_RELOAD.

The management entity 112 outputs the sub-sequence of the computer network log entries $x_i$ corresponding to $G_i(h_i, h_{i-1})=1$ as a sequence of computer network log entries indicative of a cause of an event described in a computer network log entry of a first type—Block 450. In the continuing example, the management entity 112 outputs {BGP-5-ADJCHANGE, LINK-5-CHANGED} is a sequence of computer network log entries indicative of a cause of the event SPA_OIR-3-RECOVERY_RELOAD.

Figure 6:
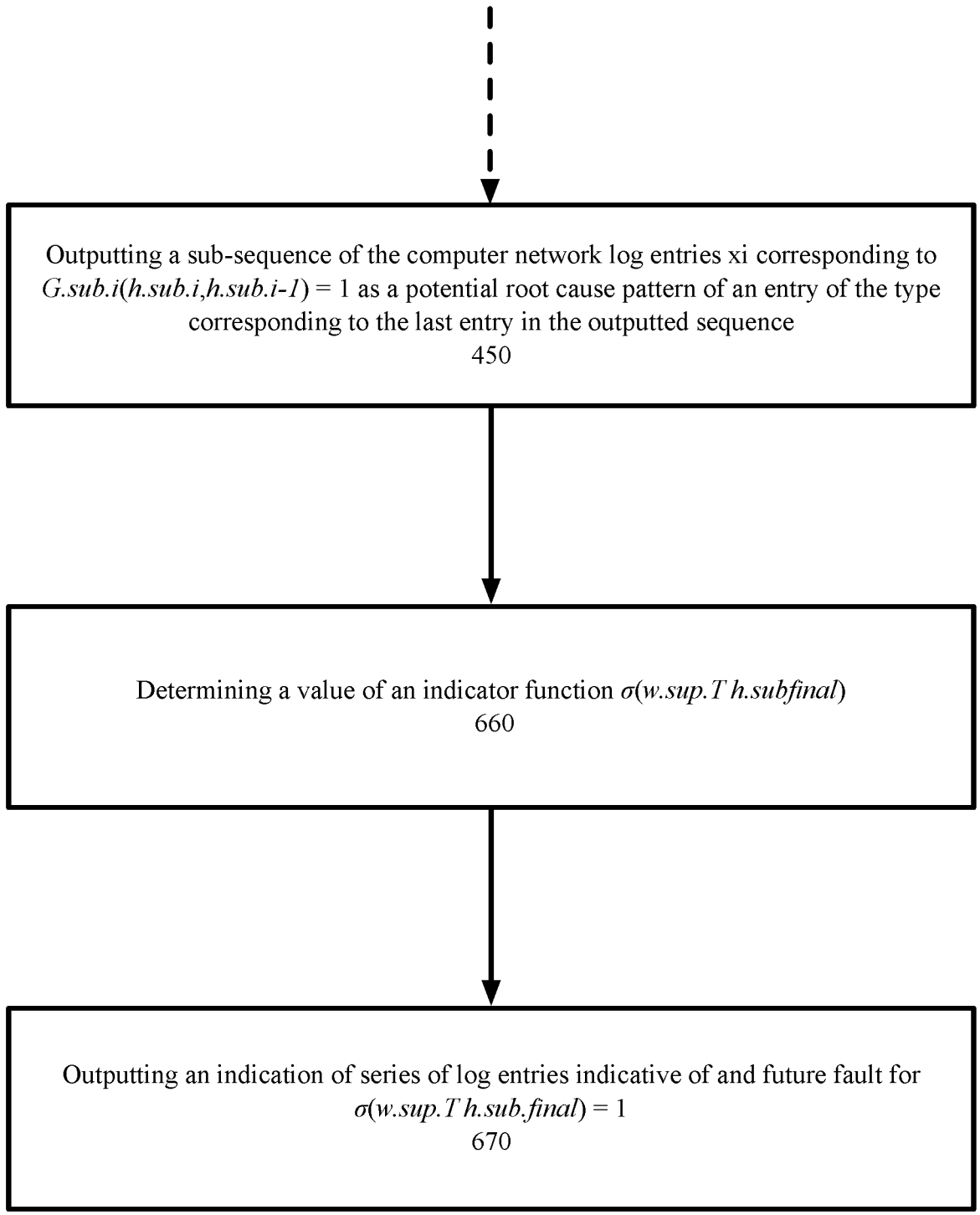
FIG. 6 is a block flow diagram depicting a method to indicate an expected upcoming event, in accordance with certain example embodiments.

Referring to FIG. 6, and continuing to refer to prior figures for context, a method 600 to indicate an expected upcoming event is shown, in accordance with certain example embodiments. In such methods, the management entity determines a value of an indicator function $\sigma(w^T h_{final})$—Block 660. The weight vector $w^T$ having been trained as described above, is the same weight vector used in determining a sequence of computer network log entries indicative of a cause of an event described in a computer network log entry of a first type.

The management entity 112 then outputs an indication of series of log entries indicative of a future fault for $\sigma(w^T h_{final})=1$—Block 670. In the continuing example, the output is an alarm displayed to a system administrator when a sequence such as {BGP-5-ADJCHANGE, LINK-5-CHANGED} is detected. In general, a much wider variety of sequences and patterns will create the conditions for $\sigma(w^T h_{final})=1$, based on the training. In other embodiments, the output triggers automatic network mitigation measures, for example, re-configuring the network to replace the functionality of the alarming device.

In test runs, failure sequence prediction has performed with precision=1.00, recall=0.98, and F-score=0.99 (on support of 124). Normal sequence prediction in those tests were precision=0.75, recall=1.00, and F-score=0.86 (on support of 6).

Other Example Embodiments

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A computer-implemented method, comprising:
   training, by one or more computing devices, a long short-term memory (LSTM) recurrent neural network to detect computer network log entries of a first type in sequences of computer network log entries, the LSTM recurrent neural network characterized by a plurality of ordered cells and a final sigmoid layer, the final sigmoid layer receiving the output of a final cell and characterized by a weight vector;
   receiving, by the one or more computing devices, a sequence of computer network log entries from one or more network devices of the computer network; determining, by the one or more computing devices, an output value for each computer network log entry in the sequence in accordance with a corresponding trained cell in the plurality of ordered cells;

determining, by the one or more computing devices, a value of a gating function based on each cell output, an output of the preceding cell in the plurality of ordered cells, a bias parameter, and the weight vector, the gating function yielding a first value for a positive value or a second value otherwise; and outputting, by the one or more computing devices, a sub-sequence of the computer network log entries corresponding to the gating function yielding a positive value and indicating a cause of a failure event described in the computer network log entry of the first type.

2. The method of claim 1, wherein training comprises:

identifying, by the one or more computing devices, a positive class of computer network log entries comprising those entries in a time window $\Delta t+_i$ ending at the time of each computer network log entry describing an event of the first type, and a negative class of computer network log entries comprising those entries in a time window $\Delta t-_i$ ending at a time prior to the beginning of the time window $\Delta t+_i$; and training, by the one or more computing devices, the LSTM recurrent neural network to identify computer network log entries of both the positive class and the negative class.

3. The method of claim 2, wherein the time window $\Delta t+_i$, and the time window $\Delta t-_i$, are separated by a period of computer network log entries belonging to neither the positive class nor the negative class.

4. The method of claim 2, wherein computer network log entries of the positive class are weighted greater than computer network log entries of the negative class prior to training.

5. The method of claim 2, wherein training the LSTM recurrent neural network to identify computer network log entries of both the positive class and the negative class comprises optimizing a binary cross-entropy loss function of the trainable weights based on inputs of each class.

6. The method of claim 1, further comprising:

determining, by the one or more computing devices, a value of an indicator function $\sigma(w^T h_{final})$, where $h_{final}$ is an output of the final cell and $w^T$ is a weight vector; and outputting, by the one or more computing devices, an indication of series of computer network log entries indicative of a future fault for $\sigma(w^T h_{final})=1$.

7. A computer program product, comprising:

a non-transitory computer-readable media having computer-executable program instructions embodied thereon that when executed by a computer cause the computer to identify sequences of computer network log entries indicative of a cause of an event described in a computer network log entry of a first type, the computer-executable program instructions comprising:

computer-executable program instructions to train a long short-term memory (LSTM) recurrent neural network to detect computer network log entries of a first type in sequences of computer network log entries, the LSTM recurrent neural network characterized by a plurality of ordered cells $F_i$, each cell with an output $h_i$ and a final sigmoid layer characterized by a weight vector $w^T$;

computer-executable program instructions to determine a value of a gating function $G_i(h_i, h_{i-1})=\Pi(w^T(h_i-h_{i-1})+b)$ for each computer network log entry $x_i$, where $h_{i-1}$ is an output of a previous cell, $\Pi$ is an indicator function yielding "1" for a positive value of its argument, and "0" otherwise, b is a bias parameter, and $w^T$ is a weight vector of the final sigmoid layer of the LSTM recurrent neural network; and computer-executable program instructions to output a sub-sequence of the computer network log entries xi corresponding to $G_i(h_i, h_{i-1})=1$ as a sequence of computer network log entries indicative of a cause of an event described in a computer network log entry of a first type.

8. The computer program product of claim 7, wherein training comprises:

identifying, by one or more computing devices, a positive class of computer network log entries comprising those entries in a time window $\Delta t+_i$ ending at the time of each computer network log entry describing an event of the first type, and a negative class of computer network log entries comprising those entries in a time window $\Delta t-_i$ ending at a time prior to the beginning of the time window $\Delta t+_i$; and training, by the one or more computing devices, the LSTM recurrent neural network to identify computer network log entries of both the positive class and the negative class.

9. The computer program product of claim 8, wherein the time window $\Delta t+_i$ and the time window $\Delta t+_i$ are separated by a period of computer network log entries belonging to neither the positive class nor the negative class.

10. The computer program product of claim 8, wherein computer network log entries of the positive class are weighted greater than computer network log entries of the negative class prior to training.

11. The computer program product of claim 8, wherein training the LSTM recurrent neural network to identify computer network log entries of both the positive class and the negative class comprises optimizing a binary cross-entropy loss function of trainable weights based on inputs of each class.

12. The computer program product of claim 7, wherein the event is a failure event.

13. The computer program product of claim 7, further comprising computer-executable program instructions to: determine a value of an indicator function $\sigma(w^T h_{final})$, where $h_{final}$ if an output of a final cell; and output an indication of a series of computer network log entries indicative of a future fault for $\sigma(w^T h_{final})=1$.

14. A system to identify sequences of computer network log entries indicative of a cause of an event described in a computer network log entry of a first type, comprising:

a storage device; and a processor communicatively coupled to the storage device, wherein the processor executes application code instructions that are stored in the storage device to cause the system to:

train a long short-term memory (LSTM) recurrent neural network to detect computer network log entries of a first type in sequences of computer network log entries, the LSTM recurrent neural network characterized by a plurality of ordered cells $F_i$ and a final sigmoid layer;

a first cell $F_1$ outputting a cell state vector $c_1$ and an output vector $h_1$ based on computer network log entry $x_1$ and a plurality of layered gating functions, the plurality of layered gating functions comprising a plurality of sigmoid layers and at least one hyperbolic tangent (tan h) layer, each of the plurality of layered gating functions characterized by weights;

each of a plurality of ordered cells $F_i$ after the first cell $F_1$:

receiving a subsequent sequential computer network log entry $x_i$, a cell state vector of a previous cell $c_{i-1}$, an output of the previous cell $h_{i-1}$, and outputting a cell state vector $c_i$ and a new output vector $h_i$ based on $x_i$, $c_{i-1}$, $h_{i-1}$, and a plurality of layered gating functions comprising a plurality of layered gating functions, the plurality of layered gating functions comprising a plurality of sigmoid layers and at least one tan h layer, each of the plurality of layered gating functions characterized by weights; and the final sigmoid layer receiving a $h_{final}$ output of $F_{final}$ and characterized by a weight vector $w^T$;

receive a sequence of computer network log entries $x_i$ from one or more network devices of the computer network;

determine $h_i$ for each computer network log entry $x_i$ in accordance with a trained $F_i(x_i, c_{i-1}, h_{i-1})$;

determine a value of a plurality of layered gating functions $G_i(h_i, h_{i-1}) = II\ (w^T(h_i - h_{i-1}) + b)$ for each computer network log entry $x_i$ where II is an indicator function yielding "1" for a positive value of its argument, and "0" otherwise, b is a bias parameter, and $w^T$ is a weight vector of the final sigmoid layer of the LSTM recurrent neural network; and output a sub-sequence of the computer network log entries $x_i$ corresponding to $G_i(h_i, h_{i-1}) = 1$ as a sequence of computer network log entries indicative of a cause of an event described in a computer network log entry of a first type.

15. The system of claim 14, wherein training comprises: identifying, by the one or more computing devices, a positive class of computer network log entries comprising those entries in a time window $\Delta t+_i$ ending at the time of each computer network log entry describing an event of the first type, and a negative class of computer network log entries comprising those entries in a time window $\Delta t-_i$ ending at a time prior to the beginning of the time window $\Delta t+_i$; and training, by one or more computing devices, the LSTM recurrent neural network to identify computer network log entries of both the positive class and the negative class.

16. The system of claim 15, wherein the time window $\Delta t+_i$ and the time window $\Delta t-_i$ are separated by a period of computer network log entries belonging to neither the positive class nor the negative class.

17. The system of claim 15, wherein network log entries of the positive class are weighted greater than computer network log entries of the negative class prior to training.

18. The system of claim 15, wherein training the LSTM recurrent neural network to identify computer network log entries of both the positive class and the negative class comprises optimizing a binary cross-entropy loss function of trainable weights based on inputs of each class.

19. The system of claim 14, wherein the processor executes application code instructions that are stored in the storage device to cause the system to: determine a value of an indicator function $\sigma(w^T h_{final})$, where $h_{final}$ if an output of a final cell; and output an indication of a series of computer network log entries indicative of a future fault for $\sigma(w^T h_{final}) = 1$.

* * * * *